United States Patent
Knoll et al.

(10) Patent No.: US 6,830,814 B1
(45) Date of Patent: Dec. 14, 2004

(54) LAYER CONTAINING AN ELECTROCONDUCTIVE TRANSPARENT MATERIAL, METHOD FOR PRODUCING SAME AND USES THEREOF

(75) Inventors: Peter Knoll, Ettlingen (DE); Hagen Klausmann, Erlangen (DE); Ewald-Theodor Ginter, Stuttgart (DE); Joachim Glueck, Renningen (DE); Erhard Hoffmann, Stuttgart (DE); Martin Hueppauff, Stuttgart (DE); Frank Druschke, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 114 days.

(21) Appl. No.: 10/030,936

(22) PCT Filed: Jul. 8, 2000

(86) PCT No.: PCT/DE00/02234

§ 371 (c)(1),
(2), (4) Date: Jul. 8, 2002

(87) PCT Pub. No.: WO01/06306

PCT Pub. Date: Jan. 25, 2001

(30) Foreign Application Priority Data

Jul. 20, 1999 (DE) .......................................... 199 33 843

(51) Int. Cl.⁷ .......................... B32B 27/16; B32B 27/30; B32B 31/28
(52) U.S. Cl. .................... 428/411.1; 428/500; 428/910; 427/508; 427/520; 427/553
(58) Field of Search ...................... 428/1.3, 1.4, 411.1, 428/500, 910; 252/500; 427/508, 510, 516, 520, 553, 555

(56) References Cited

U.S. PATENT DOCUMENTS

| | | | |
|---|---|---|---|
| 5,266,337 A | 11/1993 | Baerwald et al. | 426/15 |
| 5,300,575 A | 4/1994 | Jonas et al. | 525/186 |
| 5,357,357 A | 10/1994 | Imazeki et al. | 359/76 |
| 5,498,762 A | 3/1996 | Eguchi | 428/1.2 |
| 5,748,271 A | 5/1998 | Half mufion et al. | 349/69 |
| 5,766,515 A | 6/1998 | Jonas et al. | 252/500 |
| 6,088,635 A | 7/2000 | Cox et al. | 701/19 |
| 6,222,601 B1 | 4/2001 | Choi et al. | 349/129 |

FOREIGN PATENT DOCUMENTS

| | | |
|---|---|---|
| DE | 197 48 270 A1 | 5/1998 |
| DE | 199 33 843 A1 | 3/2001 |
| EP | 0 374 865 A2 | 6/1990 |
| EP | 0 686 662 A | 12/1995 |
| EP | 0 686 662 A2 | 12/1995 |
| EP | 0 440 957 B1 | 3/1996 |
| WO | WO 99/30352 A2 * | 6/1999 |
| WO | 01/06306 A2 | 1/2001 |

OTHER PUBLICATIONS

English language translation of EP 374,865, Jun. 1990.*
Derwent Acc. No. 1990–195063, abstract of EP 374865, Jun. 1990.*
Derwent Acc. No. 1999–395045, abstract of WO 99/30352, Jun. 1999.*
Patent Absracts of Japan, vol. 1995, No. 06, Jul. 31, 1995 & JP 07072483 A, Mar. 17, 1995.
Patent Abstracts of Japan 07072483 of Mar. 17, 1995 &JP 05219704 of Sep. 3, 1993.

* cited by examiner

Primary Examiner—Ramsey Zacharia
(74) Attorney, Agent, or Firm—Michael J. Striker

(57) ABSTRACT

In order to disclose a structure, which performs the functions of a structured, organic, electrically conductive, transparent electrode and an orientation layer, a cost-reducing and time-saving method for producing such a structure, and uses of this structure, the invention proposes a layer on a substrate, which layer contains an organic, transparent, electrically conductive material and which has a preferred orientation, a method for producing such a layer, in which a transparent, electrically conductive layer is produced and oriented on a substrate, and a use of such a layer as a combined electrode-and orientation layer in LC displays.

20 Claims, 1 Drawing Sheet

LAYER CONTAINING AN ELECTROCONDUCTIVE TRANSPARENT MATERIAL, METHOD FOR PRODUCING SAME AND USES THEREOF

BACKGROUND OF THE INVENTION

The invention relates to a layer that contains an organic, transparent, electrically conductive material, a method for producing such a layer, and the use of said layer, in particular in LC displays.

Conventional LC displays have two glass substrates that are coated on one side with a polarization filter and on the other side with a structured electrode (one of the electrodes can also be unstructured) made of indium tin oxide (ITO), which is coated with an orientation layer, for example made of polyimide. The orientation layer is used to induce a privileged direction of molecules, for example, parallel to one surface. The orientation is usually produced by means of friction. With the orientation layers, the coated glass substrates define the opposite surfaces of a liquid crystal. ITO is deposited by means of sputtering in a vacuum process, which is expensive. This is followed by the structuring of the ITO layer by means of photolithography, in which the exposed ITO is etched away by means of HBr or HCl and $HNO_3$. The above-mentioned materials and process steps make the production of the layer structure expensive and time-consuming.

Among other things, the European patent applications 0440975 and 0686662 have disclosed organic, electrically conductive polythiophene derivatives; the latter application mentions, among other things, using polyethylene dioxythiophenes as electrode material for LC displays. The polythiophenes are produced by thiophenes being oxidatively polymerized, particularly in the presence of polyacids. During the polymerization, the polythiophenes are given positive charges. The polymer produced is deposited onto the glass substrate and is converted into the layer by drying and optional tempering. This production is simpler and less expensive than the production of ITO layers. The structuring of the organic, conductive polymers is somewhat less expensive than that of ITO because no strong anorganic acids have to be used for the etching. The method for producing the entire layer structure of LC displays, however, remains quite expensive.

SUMMARY OF THE INVENTION

The object of the invention is to disclose a structure, which performs the functions of a structured, organic, electrically conductive, transparent electrode and an orientation layer, a cost-reducing and time-saving method for producing such a structure, and uses of this structure.

This object is attained with a layer of the type mentioned at the beginning, which is characterized in that the layer is oriented by means of a method of the type mentioned at the beginning, in which layers produced in a conventional manner are oriented, which contain an organic, electrically conductive, transparent material, and is attained with the use of the layer in an LC display as a combined electrode and orientation layer. The layer according to the invention thus renders an additional orientation layer superfluous. As a result, the method for producing LC displays can be executed in a manner that saves a significant amount of time and expense without becoming more complex, because its execution only makes use of conventional process steps and devices. The layer according to the invention is particularly used in LC displays in which it replaces the previously conventional structure made up of an electrically conductive, transparent electrode and an orientation layer. The structure according to the invention is thus embodied more simply than known structures and can be produced with fewer process steps and the materials are cheaper and more environmentally friendly.

It is advantageous if the material is a doped polymer, which is preferably a mixture of a polymer, which is selected from the group including polythiophenes, polyacetylenes, polypyrroles, polyanilines, and the like, at least one polyanion, which is preferably comprised of organic compounds containing di- and polyhydroxy- and/or carboxylic acid- or sulfonic acid groups, and particularly preferably at least one polyanion comprised of polycarboxylic acids or polysulfonic acids. In this connection, a "doped" polymer is understood to be a polymer which has been modified by means of oxidation or reduction reactions to form a batch-transfer complex with a metallic, electrical conductivity characteristic.

It is advantageous if the conductive polymer was produced by means of photo-induced or electron beam polymerization or if the conductive polymer was modified in such a way that it became photo-cross-linkable, and was then photopolymerized (in the following, the terms "photopolymerization" and "photo-cross-linking" will always be used for both photopolymerization and electron beam polymerization as well as for both photo-cross-linking and electron beam cross-linking). With polymers of this kind, the method can be simplified particularly if the layer, for example for use in an LC display, must be photolithographically structured by means of selective etching, because the production of a photoresistive masking can then be eliminated.

Such a simplification can also be achieved if the layer contains—optionally in addition to the photopolymerized or photo-cross-linked conductive polymer—a bonding agent that is a polymer, which has been cross-linked by irradiation. This multitude of possibilities permits flexible adaptation to other requirements of the method.

It is favorable if the photopolymerizable starting material for the polymer, the cross-linkable polymer, and/or the cross-linkable bonding agent can also be photo-oriented because in the irradiation for the polymerization or cross-linking, when linearly polarized light is used, for example by virtue of the illumination being routed through the polarization filter of the LC display, the orientation of the layer or at least the induction of the privileged direction or the setting of the tilt angle can be executed at the same time.

However, the orientation can also be advantageously produced—as in conventional orientation layers—by means of friction, because it has surprisingly been determined that this orientation method also functions with electrode layers comprised of organic, electrically conductive materials.

Other advantageous embodiments of the layer according to the invention and the method according to the invention ensue from the dependent claims.

BRIEF DESCRIPTION OF THE DRAWINGS

The invention will be described in detail below in conjunction with exemplary embodiments explained by means of drawings.

DETAILED DESCRIPTION OF THE PREFERRED EMBODIMENTS

Figure 1:
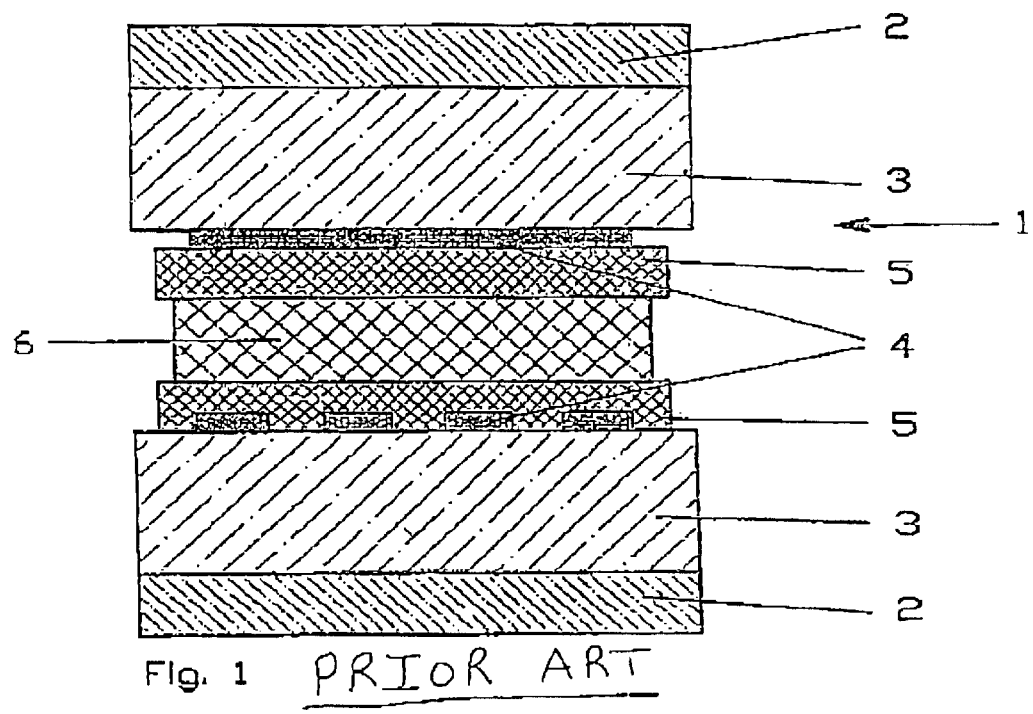
FIG. 1 schematically depicts a cross section through a conventional LC display according to the prior art.

FIG. 1 depicts the structure of an LC display 1 according to the prior art. A polarization filter 2 has a glass substrate 3 affixed to it, with an electrically conductive layer 4 mounted thereon, which is comprised of ITO or an organic, electrically conductive polymer such as polyethylene dioxythiophene polystyrene sulfonate (PEDT/PSS). The PEDT/PSS-containing layer is produced in an intrinsically known manner in that the solution of an oxidation agent, such as potassium peroxydisulfate, in water, has a thiophene, such as 3,4-ethylene dioxythiophene, and a polyacid, such as polystyrene sulfonic acid, added to it and is then stirred for approx. 8 hours; the polythiophene dispersion obtained is then deposited onto the substrate by spraying, immersion, or a printing process—optionally, after being mixed with a bonding agent, such as polyvinyl alcohol or polyvinyl acetate—, and is then dried and tempered. The layer thicknesses lie between approx. 10 nm and approx 1 μm, preferably between approx. 100 nm and approx. 500 nm. The layer 4 is structured. The structuring takes place—provided that a printing process has not been used—photolithographically by virtue of the fact that a photoresistive layer is applied to the layer 4 and is irradiated and developed in accordance with the desired structure, and then the exposed regions of the layer 4 are etched away by means of HBr or HCl and $HNO_3$ when the layer material is ITO, and by means of an organic solvent or powerfully basic solutions when the material is organic, such as PEDT/PSS. Alternatively, it is also possible, through selective treatment with a potassium permanganate solution, to nullify the conductivity of the treated locations in the layer material. An orientation layer 5, for example comprised of polyimide, is deposited onto the structured layer 4 and is oriented by means of friction, for example by means of a velvet cloth. The structure produced and a structure that is also comprised of the layers 2 to 5—however, layer 4 can also be unstructured—are arranged parallel to one another so that the orientation layers are oriented toward each other and enclose a fixed intermediary space. The intermediary space is filled with a liquid crystal 6.

The exemplary embodiment of an LC display, which is described below in conjunction with FIG. 2 and contains the layer according to the invention, and the exemplary embodiments of methods for producing such an LC display are in fact particularly advantageous, but it should be clearly understood that they are only mentioned by way of example and that numerous deviations from them are possible within the scope of the claims.

Figure 2:
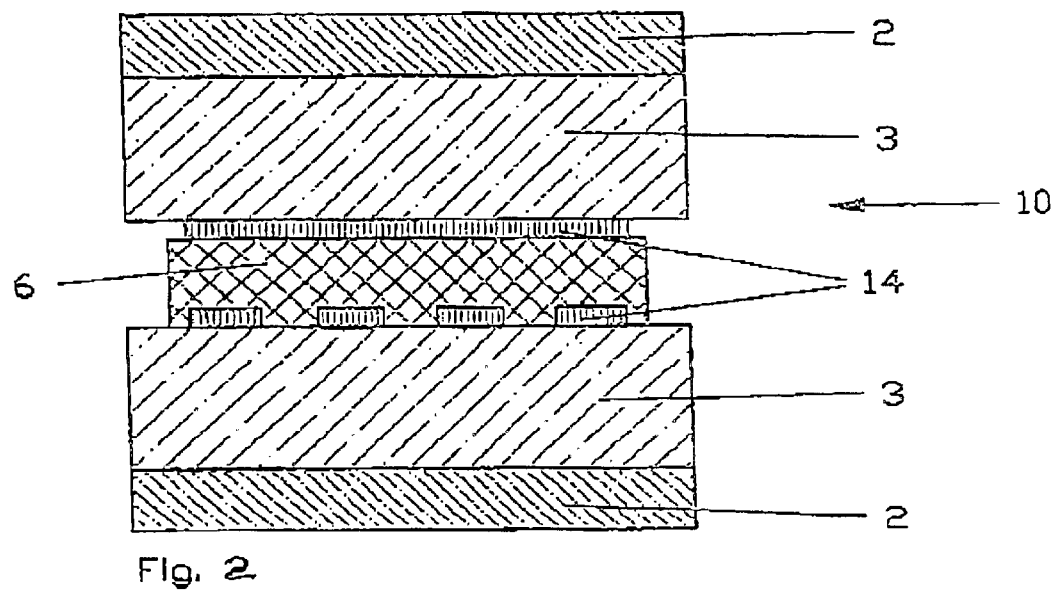
FIG. 2 is a schematic, cross-sectional depiction of an LC display that contains the structure according to the invention.

FIG. 2 shows an LC display 10 that contains the layer according to the invention. A polarization filter 2 has a glass substrate 3 affixed to it, with an electrically conductive, transparent layer 14 thereon, which preferably contains a polymer, which is selected from the group including polythiophenes, polyacetylenes, polypyrroles, polyanilines, derivatives of the above-mentioned compounds, and the like, a polyanion, for example the anion of a polycarboxylic acid or polysulfonic acid, and possibly a bonding agent such as polyvinyl alcohol or polyvinyl acetate. A particularly advantageous combination of one of the above-mentioned polymers and one of the above-mentioned polyanions is PEDT/PSS. The layer thicknesses lie in the same range as in the known layers. The layer 14 is structured. By contrast with the known LC display, no orientation layer is deposited on the layer 14; in fact, it has surprisingly turned out that the layer 14 can be oriented by means of friction and therefore can also perform the function of the orientation layer. The structure produced and a structure that is also comprised of the layers 2, 3, and 14—layer 4 can also be unstructured—are disposed parallel to one another so that the electrode layers are oriented toward each other and enclose a fixed intermediary space. The intermediary space is filled with a liquid crystal 6.

In order to produce the layer structure, first the polymer is produced in that the solution of an oxidation agent, such as potassium peroxydisulphate in water, has a thiophene, such as 3,4-ethylene dioxythiophene, and a polyacid, such as polystyrene sulfonic acid, added to it, and is then stirred for between a few minutes and 30 hours, preferably between 30 minutes and 10 hours. Then the dispersion obtained, which contains the polythiophene and the polyanion, is deposited onto the substrate, for example by means of spraying or immersion, possibly after the addition of a bonding agent, and is then dried and tempered. The structuring is preferably executed in a photolithographic manner (see above) through selective etching or selective nullification of the conductivity of the layer 14. Finally, the layer obtained is oriented by means of friction. The steps of structuring and orientation can also be reversed.

Alternatively, the layer material can be produced by means of irradiation. There are numerous possibilities for this. The starting material for the transparent, electrically conductive material can be a photopolymerizable resin, which is polymerized by irradiation after being deposited onto the substrate. Another way is to produce the electrically conductive polymer and then to cross-link it by irradiation. The conductive polymer in this case can be produced either—as described above—through oxidative polymerization or through the above-mentioned polymerization by irradiation. In photo-cross-linking, the process can, for example, be executed so that the conductive polymer is modified by means of photo-cross-linkable substituents, i.e. substituents such as an acrylic acid derivative that contains, for example, at least one multiple bond (thus rendering the conductive polymer photo-cross-linkable) and is then photo-cross-linked by irradiation.

Finally, it is also possible to mix the conductive polymer with the starting material of a bonding agent, which is photo-cross-linkable, and then to cross-link the starting material by irradiation. In so doing, the conductive polymer bonded into a matrix comprised of the bonding agent. Starting materials can include, for example, a photoresistive coating, acrylic acid resins, or methacrylic acid resins.

It is also possible on the one hand, to produce the final form of the conductive polymer by means of photopolymerization and/or photo-cross-linking and on the other hand, to produce the bonding agent by means photo-cross-linking.

The polymerization or cross-linking by irradiation is advantageous particularly if the layer containing the conductive polymer is to be structured, because the production of a structured photoresistive layer is then eliminated. As a result, the method for producing the electrode layer is significantly simplified and chronologically shortened (the process steps with which the photoresistive masking is produced are eliminated) and the number of acquired materials is reduced (in addition to the photoresist, the developer is also eliminated).

Friction is not the only way in which an orientation can be imparted to a polymer. In the orientation process, advantageous use can be made of the property, which causes some photo-cross-linkable polymers or their photopolymerizable and/or photo-cross-linkable starting materials to orient themselves when irradiated with linearly polarized light. This is referred to as so-called photo-orientation. Conductive layers that are produced from materials, which can be both photo-cross-linked and photo-oriented, can be produced, for example, by the conductive polymer being mixed with a polymer that serves as a bonding agent, which when irradiated with a linearly polarized light, cross-links in an anisotropic manner, i.e. forms a privileged direction. Possible polymers of this type include, for example, stilbene derivatives and cinnamic acid derivatives.

However, with these compounds, an illumination is required in order to induce the privileged direction and to adjust the tilt tangle. Alternatively, it is also possible to change the conductive polymer with substituents, which induce a privileged direction through their cross-linking when irradiated with linearly polarized light. Derivatives of cinnamic acid and stilbene can be cited as examples of such substituents. Therefore in general, the materials, which appear to be usable, are those that contain a substituent with a high steric demand in the 1- or 2-position of a double bond. The advantage achieved lies in the fact that the photo-cross-linking and the photo-orientation are produced in the same process step.

In summary, it can be said that with the use of the electrode according to the invention in LC displays, in comparison to the prior art, the number of layers is reduced by two and its manufacture is reduced at least by the steps, which must be executed in the depositing of two orientation layers, and with a favorable selection of starting materials for the conductive polymer and/or the bonding agent, a considerable further number of process steps can be eliminated. In conjunction with the simplification of the method, materials can also be saved, which is significant to cost considerations and to the environmental friendliness of the method. It goes without saying that by contrast with the electrodes made of ITO that are already in current use, the costly sputtering process can be eliminated.

What is claimed is:

1. A layer on a substrate, which includes an organic, transparent, electrically conductive material, wherein the layer has a preferred orientation, wherein the material is a polymer, wherein the polymer was modified in such a way that it became photo-cross-linkable and was then photo-cross-linked, and wherein the polymer includes photo-cross-linkable substituents.

2. A layer on a substrate according to claim 1, wherein the layer includes a bonding agent.

3. The layer according to claim 2, wherein the bonding agent is a polymer that is cross-linked by means of irradiation.

4. The layer according to claim 2, wherein the bonding agent is photo-oriented.

5. The layer according to claim 2, wherein the bonding agent is a polymer, which is anisotropically cross-linked by irradiation with linearly polarized light.

6. A method for producing the layer of claim 1, wherein the layer is oriented, wherein a layer that contains a transparent, electrically conductive material is produced on the substrate, wherein a polymer is used in the material, wherein the starting material for the polymer is polymerized by irradiation, and wherein the starting material for the polymer polymerizes, forming a privileged direction, when irradiated with linearly polarized light.

7. The method according to claim 6, wherein the starting material for the polymer is polymerized in the presence of at least one compound, which is capable of anion formation, and one oxidation agent.

8. The method according to claim 6, wherein a mixture is brought to reaction, which contains a monomer selected from the groups including thiophenes, polyacetylenes, polypyrroles, polyanilines, at least one organic compound containing di- and polyhydroxy- and/or carboxylic acid- or sulfonic acid groups, preferably at least one polycarboxylic acid or one polysulfonic acid, and an oxidation agent.

9. A method for producing the layer of claim 1, wherein the layer is oriented, wherein a layer that contains a transparent, electrically conductive material is produced on the substrate, wherein a polymer is used in the material, wherein the conductive polymer is modified with photo-cross-linkable substituents and is then cross-linked by irradiation.

10. A method for producing the layer of claim 1, wherein the layer is oriented, wherein a layer that contains a transparent, electrically conductive material, is produced on the substrate, wherein a polymer is used in the material, wherein the conductive polymer is modified with photo-cross-linkable substituents and is then cross-linked by irradiation, wherein said substituents are cross-linked when irradiated with linearly polarized light, and wherein the polymer is then cross-linked by at least one irradiation with linearly polarized light.

11. A method for producing the layer of claim 1, wherein the layer is oriented, wherein a starting material for the layer has a bonding agent or a starting material for such a bonding agent added to it, wherein a photo-cross-linkable polymer is used as the starting material for the bonding agent, and wherein the polymer anisotropically cross-links when irradiated with linearly polarized light.

12. The method according to claim 11, wherein the layer, at the same time as the photo-polymerization or the photo-cross-linking and the photo-orientation, is photolithographically structured by means of selective etching.

13. The method according to claim 11, wherein the conductivity in the layer is selectively nullified photolithographically by means of an oxidation agent.

14. The layer according to claim 1, wherein the polymer is a doped polymer.

15. The layer according to claim 14, wherein the doped polymer is a mixture of a polymer, wherein the polymer is selected from the group consisting of polythiophenes, polyacetylenes, polypyrroles, polyanilines and at least one polyanion, wherein the at least one polyanion is preferably comprised of organic compounds containing di- and polyhydroxy- and/or carboxylic acid- or sulfonic acid groups, and polyanions comprised of polycarboxylic acids or polysulfonic acids.

16. The layer according to claim 15, wherein the doped polymer is polyethylene dioxythiophene polystyrene sulfonate (PEDT/PSS).

17. The layer according to claim 1, wherein the polymer is photo-oriented.

18. The layer according to claim 17, wherein the polymer was modified by means of photo-cross-linkable substituents, wherein said substituents induce a privileged direction when irradiated with linearly polarized light, and was then cross-linked and photo-oriented by means of at least one irradiation with polarized light.

19. The layer according to claim 1, wherein the layer constitutes a pattern of layer segments.

20. The layer according to claim 1, wherein the conductivity in the layer is selectively nullified.

* * * * *